E. P. SPAULDING.

Improvement in Stave-Equalizer.

No. 132,989. Patented Nov. 12, 1872.

Witnesses:
E. Wolff.
C. Sedgwick.

Inventor:
E. P. Spaulding
PER Munn & Co.
Attorneys.

UNITED STATES PATENT OFFICE.

ELIJAH P. SPAULDING, OF MURFREESBOROUGH, TENNESSEE.

IMPROVEMENT IN STAVE-EQUALIZERS.

Specification forming part of Letters Patent No. 132,989, dated November 12, 1872.

*To all whom it may concern:*

Be it known that I, ELIJAH P. SPAULDING, of Murfreesborough, in the county of Rutherford and State of Tennessee, have invented a new and Improved Stave-Equalizer, of which the following is a specification:

The invention consists in a new mode of combining and arranging certain instrumentalities to form an improved stave-equalizer, as hereinafter fully described.

Figure 1:
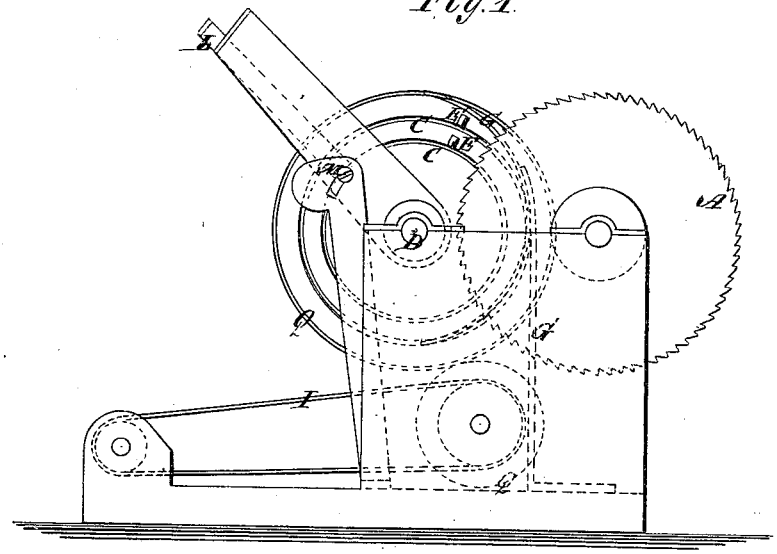
Figure 2:
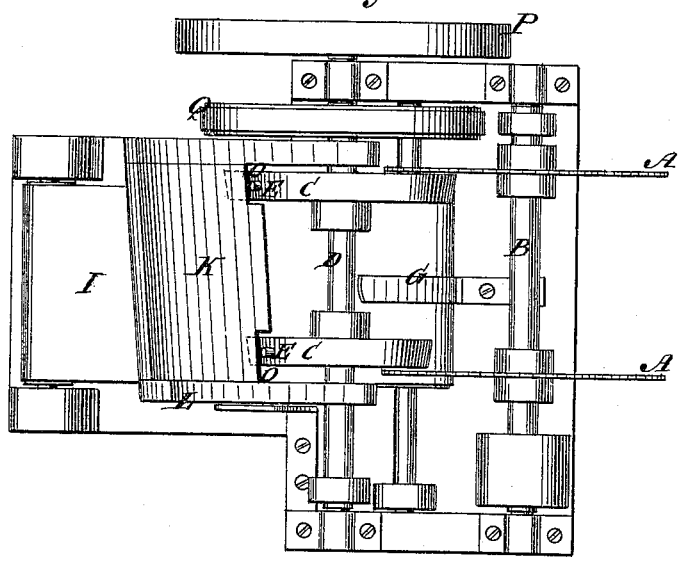

Figure 1 is a side elevation of my improved machine, and Fig. 2 is a plan view of it.

Similar letters of reference indicate corresponding parts.

A represents a pair of circular saws, preferably mounted on the same arbor and placed as far apart as the required length of the staves to be cut. C represents a pair of disks mounted on a horizontal shaft, D, parallel with shaft B in front of it, and so as to work between the saws by lapping them back to a place where the attendant who supplies them to the carrier may take them away. The table K, whereon the staves are placed to be taken by the rotary carrier, is pivoted on the axis D of the said carrier by arms L, and is capable of swinging up and down to adjust it to the said carrier for having the right inclination to deliver the staves properly, and it is fastened at any required inclination by a screw, M, and a slotted holder, N. This table has notches O in the edge next to the carrier-disks for allowing the pins E to pass in taking the staves. Preferably, there will be two pins in each disk, so that they take two staves at each revolution. If the staves are to be sawed off square at the ends, the two disks will be of the same size; but if they are to be beveled for tapered casks one disk will be larger than the other, so as to present the staves obliquely, and the difference in the size of the two disks will vary as the taper of the cask varies. When the disks are of different sizes their faces will be correspondingly beveled. Interchangeable disks of the different kinds required will be used for adapting the machine to cut the staves to any required bevel. The rotary carrier will have a slow motion imparted in any suitable way—say, by a large pulley, P, and it will turn the endless carrier by the friction-wheels Q, or any other equivalent means.

The feeding-table may be dispensed with and the staves placed directly on the carrier by the attendant, if preferred.

Having thus described my invention, I claim as new and desire to secure by Letters Patent—

The saws, carriers, tables, spring-holder, and endless carrier, all combined and arranged as and for the purpose described.

ELIJAH P. SPAULDING.

Witnesses:
   WM. KELLEY,
   S. W. GILBERT.